US007757818B2

(12) United States Patent
Fischer

(10) Patent No.: US 7,757,818 B2
(45) Date of Patent: Jul. 20, 2010

(54) DRIVE MOTOR FOR AN ELEVATOR INSTALLATION AND METHOD OF MOUNTING A DRIVE MOTOR

(75) Inventor: Daniel Fischer, Ollon/VD (CH)

(73) Assignee: Inventio AG, Hergiswil NW (CH)

( * ) Notice: Subject to any disclaimer, the term of this patent is extended or adjusted under 35 U.S.C. 154(b) by 0 days.

(21) Appl. No.: 11/742,189

(22) Filed: Apr. 30, 2007

(65) Prior Publication Data

US 2007/0205057 A1 Sep. 6, 2007

Related U.S. Application Data

(62) Division of application No. 10/655,790, filed on Sep. 5, 2003.

(30) Foreign Application Priority Data

Sep. 5, 2002 (EP) .................................. 02405768
Apr. 29, 2003 (EP) .................................. 03405297

(51) Int. Cl.
*B66B 11/08* (2006.01)
*B66D 1/12* (2006.01)
*H02K 7/10* (2006.01)

(52) U.S. Cl. ....................... 187/254; 187/266; 187/404; 187/406; 254/278; 254/362; 254/902

(58) Field of Classification Search ......... 187/250–252, 187/254, 406, 266; 254/329, 362; *B66D 1/00, B66D 1/02, 11/08; H02K 7/10, 7/102*
See application file for complete search history.

(56) References Cited

U.S. PATENT DOCUMENTS

| | | | | |
|---|---|---|---|---|
| 1,763,198 | A | 6/1930 | Sprague | |
| 3,559,768 | A | 2/1971 | Cox | |
| 4,203,506 | A | 5/1980 | Richmon | |
| 4,664,230 | A | 5/1987 | Olsen | |
| 4,771,197 | A * | 9/1988 | Ivanto et al. | 310/67 R |
| 6,035,974 | A | 3/2000 | Richter et al. | |
| 6,098,758 | A | 8/2000 | Gates | |
| 6,230,844 | B1 * | 5/2001 | Latorre | 187/254 |
| 6,471,012 | B2 | 10/2002 | Faletto | |
| 6,488,124 | B1 * | 12/2002 | Yasuda et al. | 187/254 |
| 6,578,672 | B1 | 6/2003 | Miyoshi | |
| 6,591,944 | B2 * | 7/2003 | St. Pierre et al. | 187/254 |
| 6,598,707 | B2 | 7/2003 | Nakagaki et al. | |
| 6,601,828 | B2 * | 8/2003 | Strbuncelj et al. | 254/266 |

(Continued)

FOREIGN PATENT DOCUMENTS

| | | | |
|---|---|---|---|
| CN | 1279647 | A | 1/2001 |

(Continued)

*Primary Examiner*—John Q Nguyen
*Assistant Examiner*—Stefan Kruer
(74) *Attorney, Agent, or Firm*—Fraser Clemens Martin & Miller LLC; William J. Clemens

(57) ABSTRACT

The invention relates to an elevator installation and a method for mounting a drive unit of an elevator installation. The elevator installation comprises a car and a counterweight in a shaft and a drive unit mounted on a crossbeam or the shaft roof. The drive unit has two spaced-apart drive zones. The drive zones are in that case integrally integrated in the drive shaft and directly machined therein.

16 Claims, 5 Drawing Sheets

U.S. PATENT DOCUMENTS

| | | | | |
|---|---|---|---|---|
| 6,626,266 | B2 | 9/2003 | Hamaguchi | |
| 6,655,500 | B2 | 12/2003 | Orrman et al. | |
| 6,742,628 | B2 | 6/2004 | Bauer | |
| 6,848,543 | B2 | 2/2005 | Adifon et al. | |
| 6,991,069 | B1 | 1/2006 | Ach | |
| 7,185,743 | B2 * | 3/2007 | Fischer | 187/254 |
| 2002/0070080 | A1 * | 6/2002 | Nakagaki et al. | 187/266 |
| 2002/0074191 | A1 | 6/2002 | Pierre et al. | |
| 2002/0100902 | A1 * | 8/2002 | Strbuncelj et al. | 254/901 |
| 2002/0121729 | A1 * | 9/2002 | Curti | 264/236 |
| 2002/0185338 | A1 | 12/2002 | Bauer | |
| 2004/0104079 | A1 * | 6/2004 | Fischer | 187/254 |
| 2004/0108170 | A1 * | 6/2004 | Kocher et al. | 187/254 |
| 2006/0042881 | A1 * | 3/2006 | Fischer | 187/252 |
| 2006/0169541 | A1 * | 8/2006 | Fischer | 187/266 |
| 2006/0169544 | A1 * | 8/2006 | Fischer | 187/351 |
| 2007/0052308 | A1 * | 3/2007 | Coupart | 310/77 |
| 2007/0267930 | A1 * | 11/2007 | Ogava | 310/156.53 |

FOREIGN PATENT DOCUMENTS

| | | | |
|---|---|---|---|
| CN | 1358662 | A | 7/2002 |
| DE | 20021886 | U1 | 4/2001 |
| EP | 0 565 893 | | 10/1993 |
| EP | 0 565 893 | A1 | 10/1993 |
| EP | 0686594 | A2 | 12/1995 |
| EP | 0 970 912 | A2 | 1/2000 |
| EP | 1 197 466 | | 4/2002 |
| EP | 1 197 466 | A2 | 4/2002 |
| JP | 6087595 | | 3/1994 |
| JP | 2002167137 | | 6/2002 |
| TW | 474892 | B | 2/2002 |
| TW | 478521 | Y | 3/2002 |
| TW | 482739 | B | 4/2002 |
| WO | WO 99/43593 | | 9/1999 |
| WO | WO 99/43593 | A1 | 9/1999 |
| WO | WO 9943593 | A1 | 9/1999 |
| WO | WO 0027739 | A1 | 5/2000 |
| WO | WO 0127015 | A1 | 4/2001 |
| WO | WO 0174704 | A1 | 10/2001 |
| WO | WO 02053486 | A1 | 7/2002 |

* cited by examiner

DRIVE MOTOR FOR AN ELEVATOR INSTALLATION AND METHOD OF MOUNTING A DRIVE MOTOR

This application is a divisional of the co-pending U.S. patent application Ser. No. 10/655,790 filed Sep. 5, 2003.

BACKGROUND OF THE INVENTION

The present invention relates to a drive motor for an elevator installation and a method of mounting the drive motor in a drive unit.

The PCT specification WO99/43593 shows a drive motor with two drive pulleys engaging belts connecting an elevator car to a counterweight. The drive pulleys are arranged in the outer regions of the car plan profile, at least in the respective outer third of the car dimension corresponding with the orientation of the drive axis, or outside the car profile. The drive pulleys are arranged at both ends of the drive motor. The illustrated embodiment has various disadvantages:

Space requirement: The drive motor occupies a large amount of space.

Force introduction: The support forces have to be conducted by way of solid sub-constructions into the support structure of the elevator.

Assembly handling: The assembly and, in particular, the alignment of the drive pulley axis with respect to the running direction of the support means and drive means is costly.

SUMMARY OF THE INVENTION

The present invention relates to a drive unit for an elevator installation with car and counterweight movable in a shaft. Support and drive devices connect the car with the counterweight. The support and drive devices are termed drive means in the following. The drive means are guided by way of the drive unit. The drive means are driven by a drive shaft of the drive motor. The areas of the drive shaft that transmit the force to the drive means are termed drive zones in the following. The car and the counterweight are guided by means of car guide rails and counterweight guide rails, respectively.

The drive shaft has two mutually spaced-apart drive zones. The drive zones are matched to the form of the drive means. The number of drive means is distributed symmetrically to the two drive zones, wherein each drive zone offers space for at least one drive means.

The present invention concerns a drive unit for an elevator installation having a car and a counterweight movable in a shaft comprising: a drive motor and a brake coupled to a drive shaft; at least two drive means connected to said drive shaft and driven by said drive motor, and adapted to be connected to the car and the counterweight; and at least two mutually spaced-apart drive zones through which said drive shaft extends, each one of said at least two drive means being arranged in an associated one of said at least two drive zones and wherein at least one of said drive motor and said brake is arranged to one side of said at least two drive zones. The spacing between the at least two drive zones is at least a width of a foot of a car guide rail or a counterweight guide rail, is no more than three times a width of a foot of a car guide rail or a counterweight guide rail, and is in a range of 100 millimeters to 250 millimeters.

An object of the present invention is the provision of a drive unit and a method of mounting the same which optimize the force flow and thus keep down the demands on the adjoining construction as well as minimize the space requirement for the drive unit. The drive unit, in addition, allows a flexible arrangement in the shaft. The drive unit has two drive zones that divide support and drive means into two force transmitting paths.

According to the present invention at least one component of the drive unit, such as, for example, the motor or the brake, is arranged to the left or the right of the two drive zones. The utility of this arrangement resides in the fact that the dimensions of the drive unit are reduced. The spacing of the two drive zones can thereby be reduced in correspondence with a purpose by, for example, arranging the drive means at the smallest possible distance to the left and the right of the guide rails. The space requirement of the drive unit and of the entire drive arrangement is thereby minimized. The small dimensions of the drive unit allow a compact constructional form. The compact constructional form moreover allows an optimal introduction of the support forces into the support structure, which in turn enables simpler shapes of the sub-constructions. The assembly handling and the alignment of the drive unit are significantly improved by the compact constructional shape and the consequently possible pre-assembly of the individual sub-assemblies in an assembly-friendly environment.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1A:
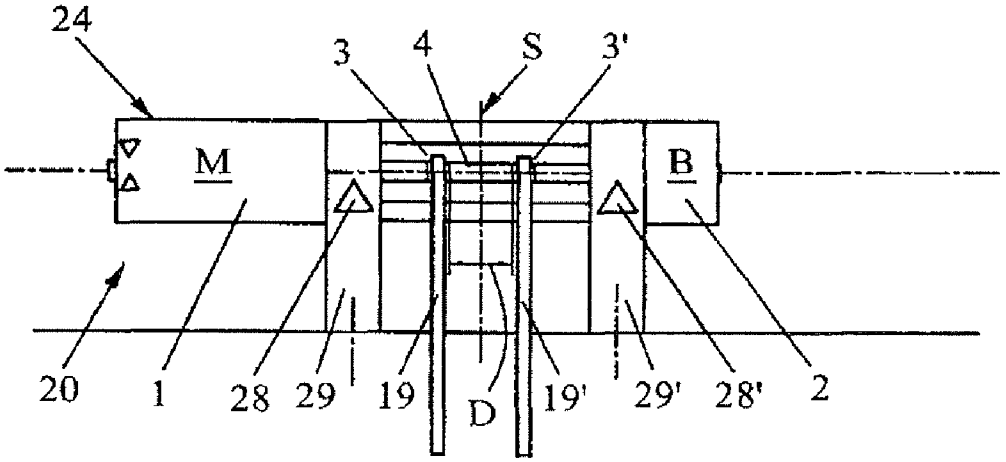
FIG. 1*a* is a schematic elevation view of a drive unit according to a first embodiment of the present invention with bearings and brackets arranged to the left and right of drive zones.

A drive unit 20 comprises, as illustrated in FIGS. 1*a* to 1*e* and FIG. 2 to FIG. 4, a drive shaft 4 that is provided with two drive zones 3, 3' spaced from one another. A motor 1 (M) and a brake 2 (B) are coupled to the drive shaft 4. The drive zones 3, 3' operate drive means 19, 19', which, as illustrated by way of example in FIGS. 5 to 8, drive a car 11 and a counterweight 12. A spacing D between the drive zones 3, 3' is advantageously selected to be as small as possible and it results from, for example, the envisaged arrangement of the drive zones 3, 3' or the drive means 19, 19' at both sides of a car guide rail 5. The motor 1 and/or the brake 2 and/or other components, such as rotational speed sensors, evacuation aids or optical indicators, are arranged, according to the invention, to the left and/or right of the two drive zones 3, 3'. The best combination can be ascertained with utilization of the arrangement possibilities of the components of the drive unit 20. The use of this arrangement results from the fact that the space requirement for the drive unit 20 can be minimized in correspondence with the requirement of the installation arrangement. The drive unit 20 is executed with a small overall length. This enables a significant degree of pre-assembly of the drive unit in a suitable working environment. The assembly is thereby simplified and sources of error are excluded.

FIG. 1*a* shows a first embodiment of the drive unit 20 having the arrangement of the motor 1 (M) and a first bearing 28 on one side of the drive zones 3, 3' and the brake 2 (B) and a second bearing 28' on the other side of the drive zones 3, 3'. Brackets 29, 29' are fastened to the support structure of the elevator installation in correspondence with the arrangement of the bearings 28, 28'. This variant is advantageously used when the spacing D between the drive zones 3, 3' is selected to be small, which by way of example is rational in the case of very small guide rail dimensions.

Figure 1B:
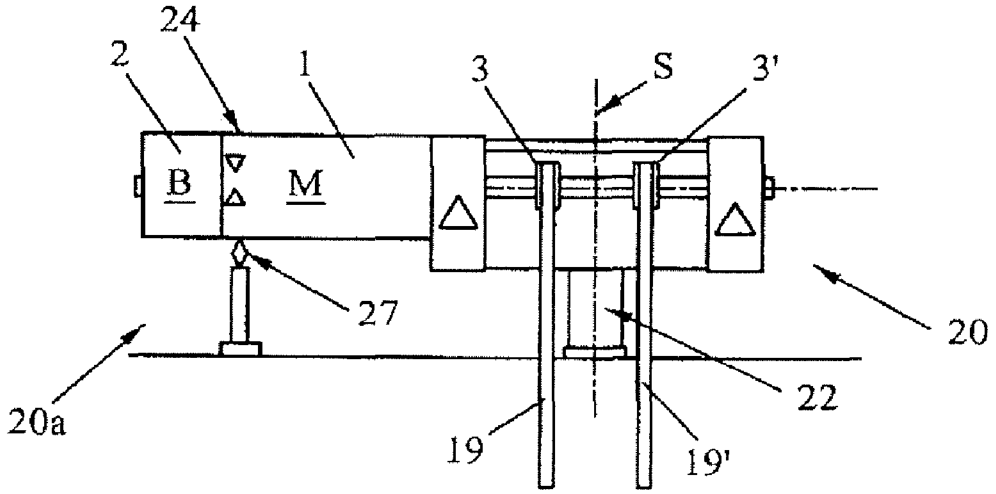
FIG. 1*b* is a schematic elevation view of a drive unit according to a second embodiment of the present invention with a central bracket, a level setting means and with bearings arranged to the left and right of drive zones.

In departure from FIG. 1*a*, FIG. 1*b* shows a second embodiment drive unit 20*a* that uses a central bracket 22 which guides the support forces of the drive unit 20*a* centrally substantially to a position in the support structure of the elevator installation. The central bracket 22 is arranged at right angles to the axis of the drive unit 20*a* to act in a plane S of symmetry of the two drive zones 3, 3'. This enables a particularly economic embodiment of the connecting construction. In addition, this arrangement enables the use of a level setting means 27 shown engaged at the end of the motor 1 adjacent to the brake 2. The level setting means 27 in that case has only small force differences to overcome, which result substantially from the weight forces of the drive itself and from inaccuracies in the drive means arrangement. The level setting means 27 enables, without special cost, alignment of the axis of the drive shaft 4 to the direction of running of the drive means 19, 19'. This alignment is advantageous particularly in the case of use of belts as drive means, since the wear behavior and noise behavior are thereby decisively influenced. In the case of inaccurate alignment of the drive motor the wear of the drive means strongly increases, which leads to early replacement of the drive means and to correspondingly high costs. For example, in this FIG. 1*b* the brake 2 and the motor 1 are arranged on-one side of the drive zones 3, 3'. This arrangement is advantageous if the space on the opposite side of the drive zones is otherwise occupied.

Figure 1C:
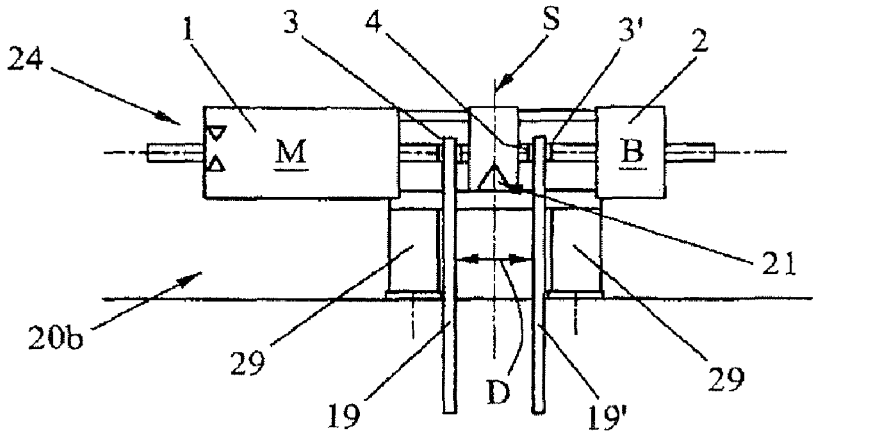
FIG. 1*c* is a schematic elevation view of a drive unit according to a third embodiment of the present invention with a central bearing and with brackets arranged to the left and right of drive zones.

FIG. 1*c* shows a third embodiment drive unit 20*b* having the arrangement of a central bearing 21 which absorbs the radial force, which is produced by the tension forces present in the drive means 19, 19' applied to the drive shaft 4 at a central position. The central bearing 21 is arranged at right angles to the axis of the drive motor to act in the plane S of symmetry of the two drive zones 3, 3'. A support bearing 24 is arranged at the motor end of the drive shaft 4. It takes over the difference forces arising in the drive system. The different forces substantially result from the weight forces of the drive itself and from inaccuracies of the drive means arrangements. The support bearing 24 additionally guarantees an exact maintenance of the air gap between the stator and the rotor of the motor 1. The drive unit 20*b* is fastened by means of two brackets 29, 29' to the support structure of the elevator installation. This arrangement is particularly advantageous when the spacing D between the drive zones 3, 3' allows sufficient space for the arrangement of the central bearing 21 and the demands on alignment accuracy of the drive shaft are low.

Figure 1D:
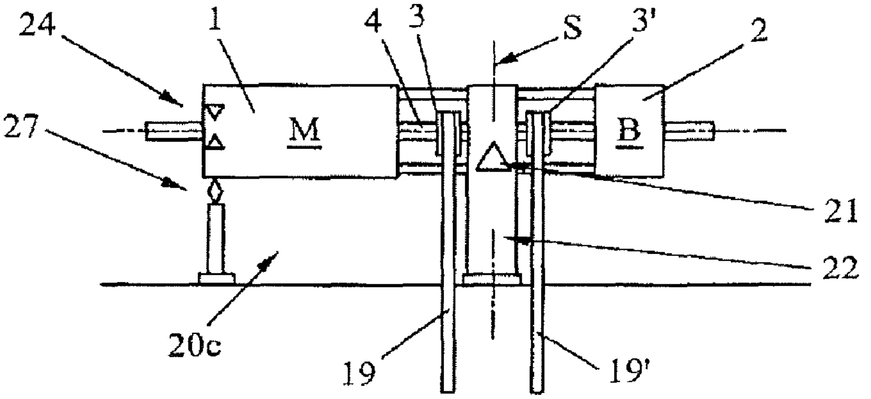
FIG. 1*d* is a schematic elevation view of a drive unit according to a fourth embodiment of the present invention with a central bearing, a central bracket and a level setting means with a variant.

FIG. 1*d* shows a fourth embodiment drive unit 20*c* having the arrangement of the central bearing 21 and the central bracket 22, which conducts the support forces of the drive unit 20*c* centrally substantially to a position in the support structure of the elevator installation. The central bracket 22 and the central bearing 21 are arranged at right angles to the axis of the drive unit 20*c* to act in the plane S of symmetry of the two drive zones 3, 3'. The level setting means 27 is preferably arranged at the outer end of the motor 1. The support bearing 24 is arranged as shown in FIG. 1*c*. The arrangement of the drive unit 20*e* in correspondence with FIG. 1*d* is particularly advantageous, since small dimensions of the drive unit 20*c* result, the forces are conducted in an optimum manner to the support structure of the elevator installation, use of only two bearing positions in the drive unit 20*c* enables a secure design of the drive shaft 4 and the alignment of the axis of the drive shaft 4 to the direction of running of the drive means 19, 19' can be carried out in simple manner.

Figure 1E:
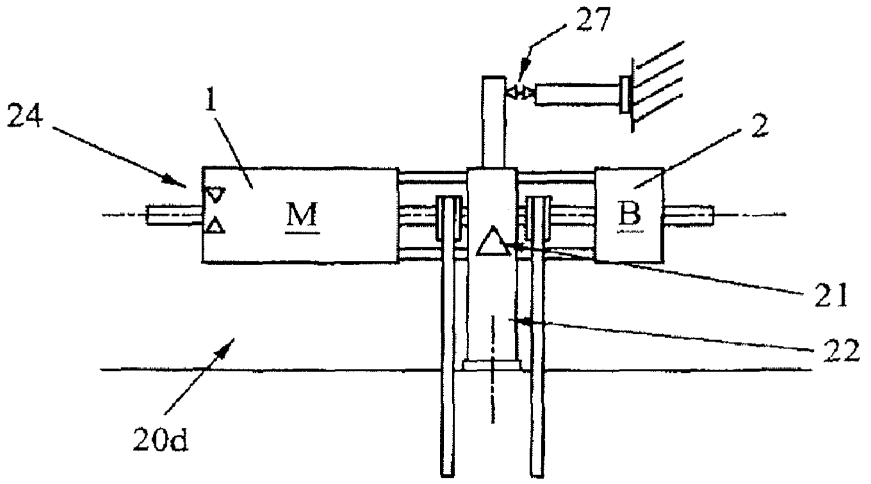
FIG. 1*e* is a schematic elevation view of a drive unit according to a fifth embodiment of the present invention with a central bearing, a central bracket and a variant of a level setting means.

FIG. 1*e* shows a fifth embodiment drive unit 20*d* having another possibility of arrangement of the level setting means 27. The level setting means 27 is arranged to directly engage at the bearing housing in this embodiment. It is identical in its effect to the embodiments shown in FIGS. 1*b* and 1*d*. Other forms best suited for a specific case of use can be devised from the teachings herein.

The drive unit arrangements shown in FIGS. 1*a* to 1*e* can be combined to result in other component configurations. Foe example, the brake 2 can be arranged between the drive zones 3, 3'.

Figure 2:
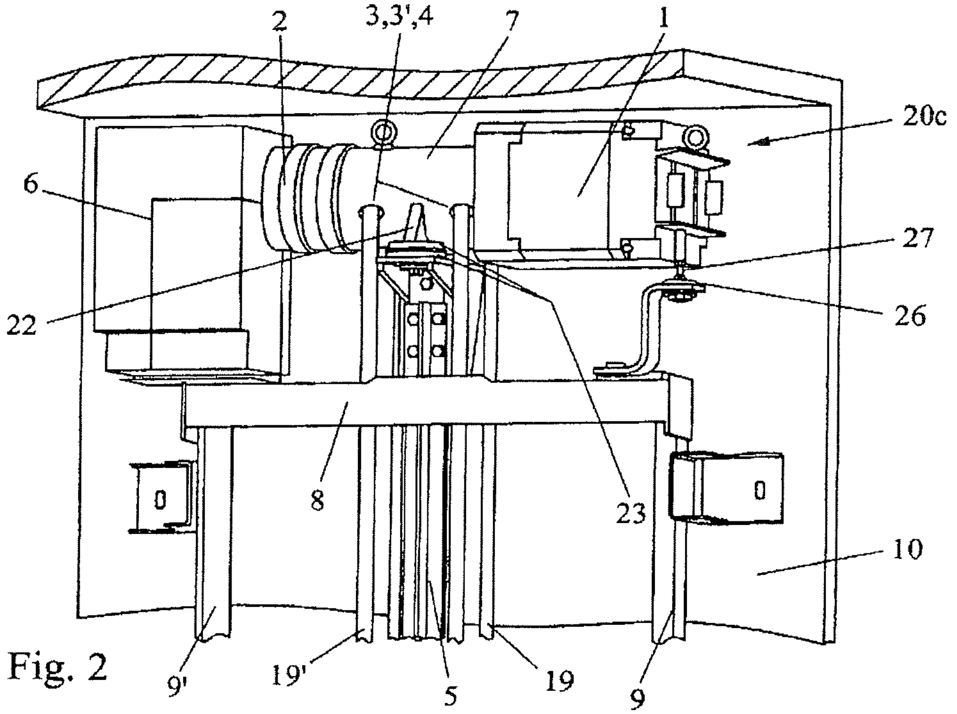
FIG. 2 is a perspective view of the drive unit shown in FIG. 1*d* having a gearless drive motor in a 2:1 ratio suspension and in vertical projection above a counterweight.
Figure 3:
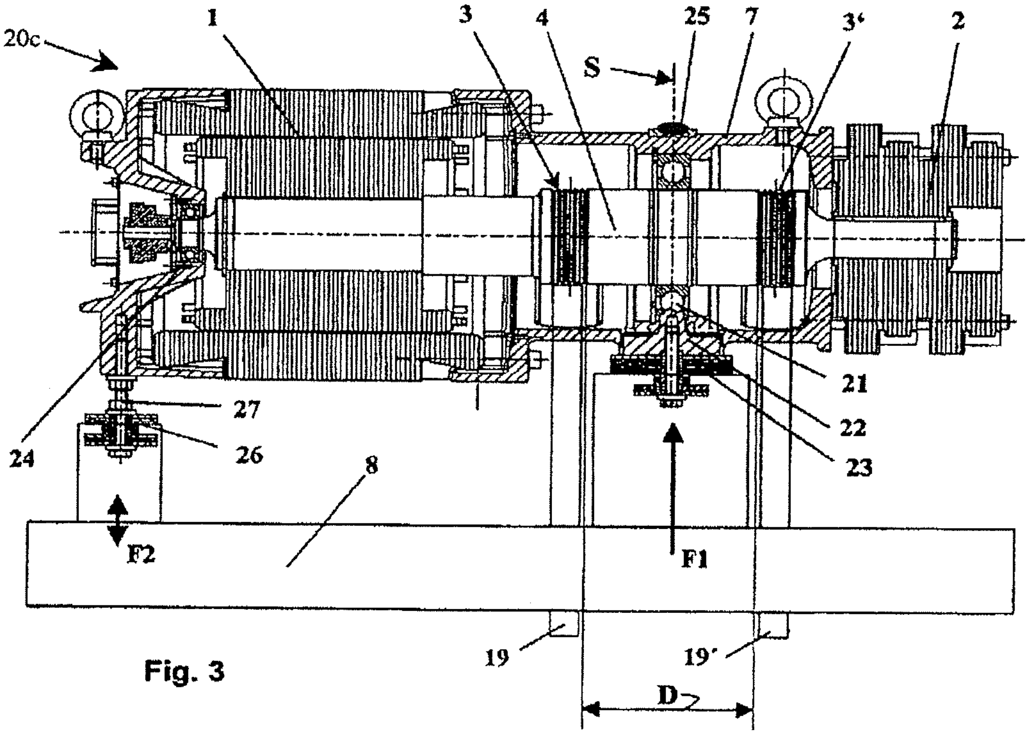
FIG. 3 is an enlarged cross section of the drive unit shown in FIG. 2.

FIGS. 2 and 3 show in detail, by way of example, of the fourth embodiment arrangement illustrated in FIG. 1*d*. The illustrated drive unit 20*c* comprises the drive shaft 4 with the two spaced-apart drive zones 3, 3'. In this example the spacing D of the two drive zones is 100 to 250 mm. This allows the arrangement of guide rail profiles which are currently used in elevator installations and which have a rail foot width of 50 to 140 mm. The preferred spacing D is in a range of one to three times the width of the foot of the guide rails being used. The drive shaft 4 is mounted in a bearing housing 7. The central bracket 22 in this case is integrated in the bearing housing 7. The central bracket 22 is arranged in the plane S of symmetry, which is at right angles to the drive axis and defined by the two drive zones, between the two drive zones 3, 3'. The drive shaft 4 is mounted in the bearing housing 7 by means of the central bearing 21 arranged between the drive zones 3, 3'. The central bearing 21 is similarly arranged to act in the plane S of symmetry. The central bearing 21 accepts the support forces due to the drive means 19, 19' and conducts them by way of the bearing housing 7, the central bracket 22 and by way of an intermediate member to the support structure of the elevator installation. The drive zones 3, 3' are machined directly into the drive shaft 4. The drive zones 3, 3' can alternatively also be mounted by means of separate elements, such as, for example, in the form of discs, on the drive shaft 4. The drive shaft 4—or the drive zones 3, 3'—is connected with the motor 1 and the brake 2 in a force-effective manner, preferably integrally and gearlessly, and thus enables drive of the drive means 19, 19' by means of the drive zones 3, 3'. The drive zones 3, 3' are, in the illustrated embodiment, similarly integrally integrated in the drive shaft 4. This is advantageous in the case of use of belts as drive means, since these drive means enable small deflecting or drive radii. Through the arrangement of the central bearing 21 between the drive zones 3, 3' the constructional space available there is utilized efficiently and the external dimensions are reduced. Due to the reduction in the number of varying positions, costs are reduced. The quality of the drive unit 20*c* is significantly increased by this arrangement, since due to the reduction in the bearing positions an over-determination of the shaft mounting is redundant.

Advantageously the brake 2 and the motor 1 are arranged, as shown in the examples, at the left and the right of the two drive zones 3, 3'. The motor 1 and the brake 2 are force-effectively connected by way of the bearing housing 7. The drive moments produced by the motor 1 and/or the braking moments produced by the brake 2 are conducted into the bearing housing 7 and by way of the central bracket 22 into the support structure of the elevator installation. The illustrated arrangement of the drive zones 3, 3' between the brake 2 and the motor 1 enables, together with the force-effective connection of brake 2, the motor 1 and the bearing housing 7, a particularly space-saving embodiment. In addition, accessibility with respect to the brake 2 and the motor 1 is ensured in ideal manner.

The support bearing 24 is arranged at the motor end of the drive shaft 4. The support bearing 24 accepts the difference forces arising in the drive system. The difference forces substantially result from the weight forces of the drive itself and from inaccuracies in the drive means arrangements. The support bearing 24 additionally ensures an exact maintenance of the air gap between the stator and the rotor of the motor 1. The support bearing 24 conducts the difference forces into the housing of the motor and the bearing housing 7. The resulting support forces are accepted by the level setting means 27 and conducted into the support structure of the elevator installation. The level setting means 27 serves at the same time for accurate and simple leveling of the longitudinal axis of the drive shaft 4 relative to the drive means 19, 19'. This alignment is advantageous particularly in the case of use of belts as drive means, since the wear behavior and noise behavior are thereby decisively influenced.

Alternatively, the level setting means 27 can be arranged, for example, horizontally as shown in FIG. 1*e*.

The bearing housing 7 illustrated in FIGS. 2 and 3 partly encloses the drive shaft 4 together with the drive zones 3, 3'. This forms a direct protection of the drive zones 3, 3' against unintended contact and risk of assembly or service personnel being caught, but also prevents damage of the drive zone or the drive means by objects dropping down. At the same time the bearing housing 7 thereby gains the requisite strength in order to accept the forces and moments from the motor 1 and the brake 2.

The drive unit 20*c* is fastened by means of vibration insulation means 23, 26. This enables a significant degree of vibration decoupling of the drive unit 20*c* from the support structure of the elevator installation. Noises in the elevator installation and/or in the building are thereby reduced.

For simple design of the central bearing 21, the internal diameter of the central bearing is selected to be greater than the diameter of the drive zones 3, 3' in the illustrated embodiment.

A drive unit form optimal in terms of cost and space is offered by the illustrated form of construction. In particular, the assembly and alignment of the drive unit can take place simply and quickly. The layout of the drive components is simplified, since the loading of the drive shaft 4 and the bearing housing 7 is defined in ideal manner by the achieved two-point mounting.

FIG. 2 shows a perspective view of the fourth embodiment of an arrangement of a gearless drive motor in the drive unit 20*c*. The drive unit 20*c* is mounted on a crossbeam 8 arranged substantially horizontally in an elevator shaft 10. The crossbeam 8 is, for example, an elongate square member formed of proven materials such as steel. In this example, the crossbeam 8 is fastened to counterweight guides 9, 9' and to the car guide 5 at a first wall of the shaft. Advantageously the crossbeam 8 is fastened by way of two end regions to the counterweight guides 9, 9' and by way of a center region to the car guide 5. The fastening of the crossbeam 8 to these three guides is carried out in the three fastening regions by way of, for example, screw connections. The illustrated form of embodiment results in an optimum utilization of the constructional space and enables a significant degree of preparation of the assembly in a cost-optimal manner in construction works or in a corresponding environment.

A control and/or a transformer 6 of the elevator installation is, as shown in FIG. 2, fastened in the vicinity of the drive unit, advantageously similarly on the crossbeam 8. This fastening is, if necessary, insulated against vibration. The drive unit can thus be delivered and assembled together with the associated converter with prefinished cabling. Possible changes in position, which can result due to construction contraction, cannot have any effect and the entire unit can be produced particularly economically. If appropriate, the control and/or transformer 6 can additionally be supported relative to the wall.

As shown in FIG. 3, a leveling balance 25 is advantageously arranged at the drive unit 20*c*. The leveling balance 25 is, for example, a water balance that indicates the horizontal position of the drive unit 20*c*. The leveling balance 25 allows a simple check of correct leveling and accordingly enables a quick correction of the alignment of the drive unit 20*c*.

Figure 6:
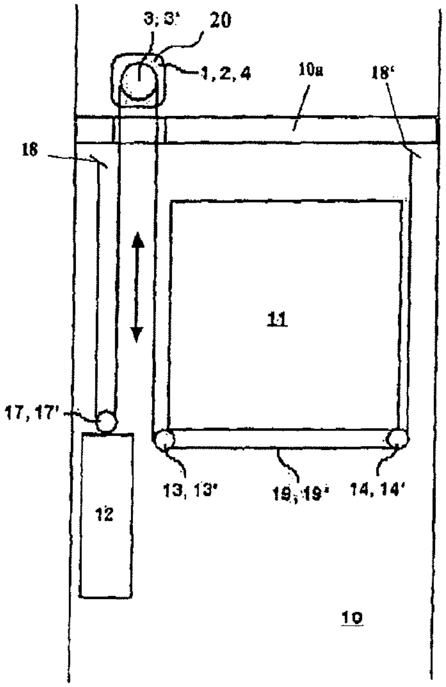
FIG. 6 is a view similar to FIG. 5 with the drive unit above a ceiling of the shaft.

The use of the drive unit 20*c* shown by way of example is universally possible for many types of installation. The arrangement shown in FIG. 2 refers to an elevator without a separate motor room. However, the use is not limited to elevator installations without a motor room. If a motor room is present the drive unit can, for example, be mounted on the shaft roof as shown in FIG. 6.

With the illustrated possibilities the arrangement of the drive unit can be flexibly adapted, for example in the case of modernizations, to predetermined shaft conditions, which flexibility thus enables use of standard parts and avoids costly special solutions.

Different possibilities of arrangement of the drive unit are illustrated, by way of example, in the following.

Figure 4:
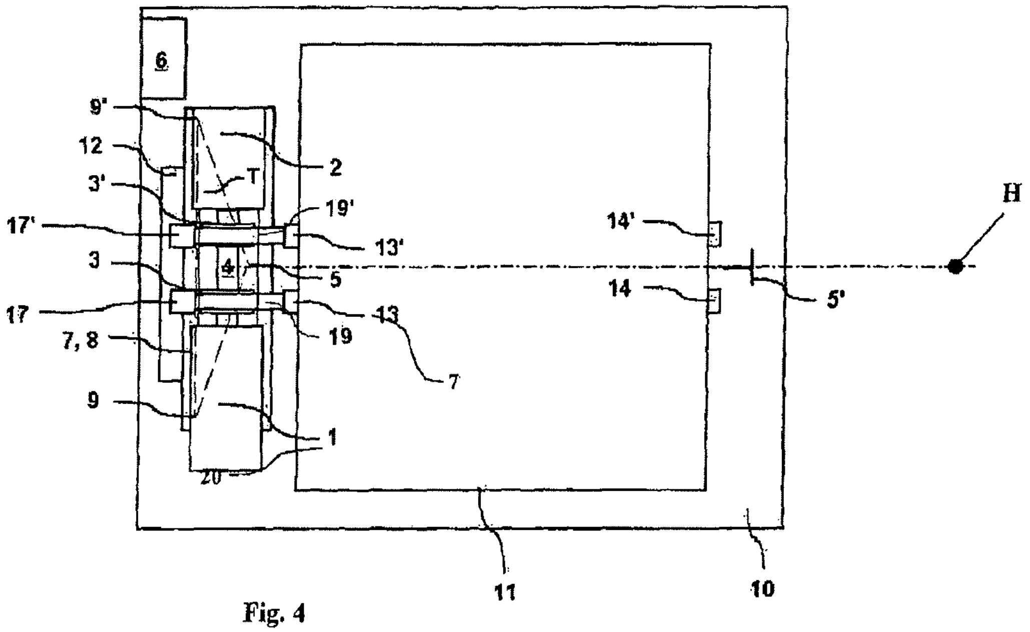
FIG. 4 is a schematic plan view of an elevator installation with the drive unit shown in FIG. 1*a* arranged in an elevator shaft.
Figure 5:
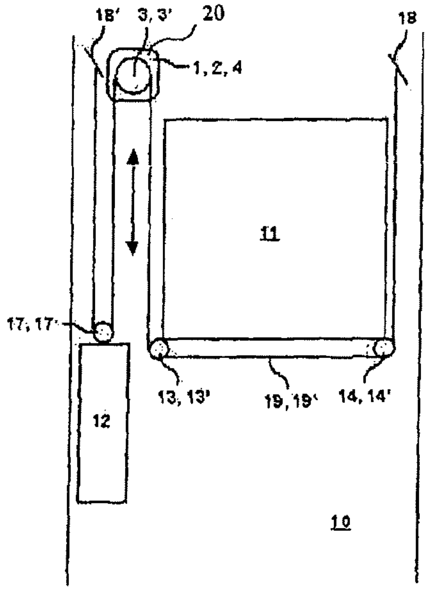
FIG. 5 is a schematic elevation view of the elevator installation shown in FIG. 4 with the drive unit in a 2:1 suspension ratio.

FIGS. 4 and 5 show a preferred use of the drive unit according to the present invention as is used, for example, in the case of new installations. FIG. 4 shows a triangular arrangement of the guides 5, 5', 9, 9' in the substantially vertical shaft 10 of an elevator installation. The shaft 10 has, for example, a rectangular cross-section with four walls. Substantially vertically arranged car guides 5, 5' and counterweight guides 9, 9' are arranged in the shaft. The two car guides guide the car 11 and the two counterweight guides guide the counterweight 12. The guides are fastened to adjacent walls. The two counterweight guides 9, 9' and the car guide 5 are fastened to a first wall. The car guide 5' is fastened to a second wall. The second wall is disposed opposite the first wall. The first car guide 5 is arranged substantially centrally between the two counterweight guides 9, 9'. The guides are formed of proven materials, such as steel. The fastening of the guides to the walls takes place by way of, for example, screw connections. However, other shaft shapes with square, oval or round cross-section can be realized.

The two counterweight guides 9, 9' and the first car guide 5 define apices of a substantially horizontal triangle T in the shaft 10. An imaginary line horizontal connector between the two counterweight guides forms a first side or base of the triangle T. Imaginary line horizontal connectors between each counterweight guide and the first car guide form second and third sides of the triangle T. Advantageously the horizontal connector of the car guides intersects an imaginary line horizontal connector H of the counterweight guides substantially centrally so that the triangle T is substantially equilateral.

Advantageously the two drive zones 3, 3' of the drive unit 20 are arranged symmetrically to the left and right of the horizontal connector H of the car guides 5, 5'.

The drive unit 20 arranged substantially horizontally in the shaft 10 moves the car 11 and the counterweight 12, which are connected together by means of the at least two drive means 19, 19', in the shaft 10. Each of the drive means has two ends 18, 18'. The drive means is a cable and/or a belt of any nature. The load-bearing regions of the drive means usually consist of metal, such as steel, and/or plastic material, such as aramide. The cable can be a single cable or multiple cable and the cable can also have an external protective casing of plastic material. The belt can be flat and externally unstructured to be smooth or, for example, structured in wedge ribs or as a cogged belt. The force transmission takes place, in correspondence with the form of embodiment of the drive means, by way of friction couple or mechanically positive connection. The drive zones 3, 3' of the drive shaft 4 are executed in correspondence with the drive means. According to the present invention at least two drive means are used and several drive means can be provided.

Figure 7:
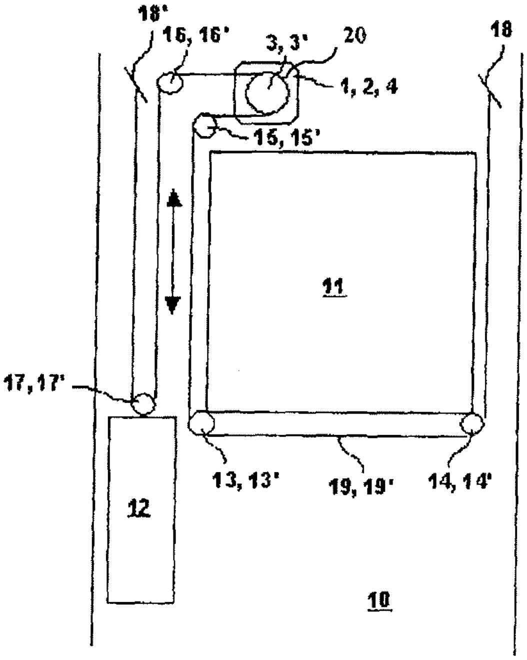
FIG. 7 is a view similar to FIG. 5 with the drive unit above the car in a 2:1 suspension ratio.

Each of the ends 18, 18' of the drive means 19, 19' is fixed to a shaft wall, a shaft roof, a car guide, a counterweight guide, the crossbeam 8, the car 11 and/or the counterweight 12. Advantageously the ends of the drive means are fixed by way of resilient intermediate elements for the damping of solid-borne sound. The intermediate elements are, for example, spring elements which prevent transmission of oscillations, which are perceived as unpleasant, from the drive unit to the shaft wall the shaft roof, the car guides, the counterweight guides, the crossbeam, the car and/or the counterweight. Several forms of fixings of the ends of the drive means are possible, for example:

In the installations according to FIGS. 5, 6 and 7, one or both of the ends 18, 18' of the drive means is or are fastened to the shaft wall, the shaft ceiling, the car guides, and/or the crossbeam.

Figure 8:
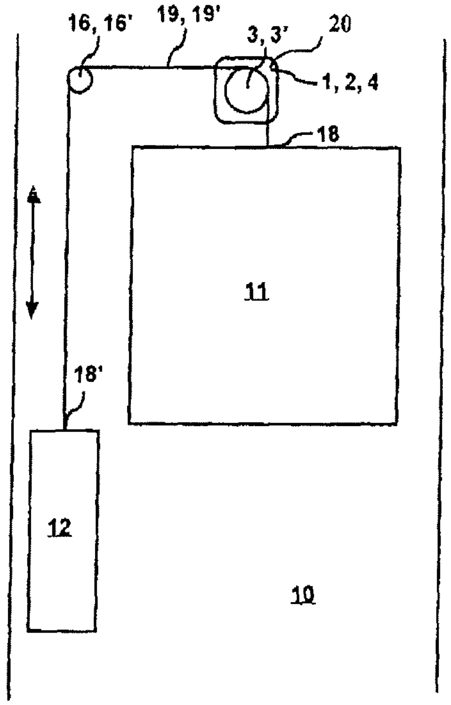
FIG. 8 is a view similar to FIG., 5 with the drive motor above the car in a 1:1 suspension ratio.

In the installation according to FIG. 8, a first end 18 of the drive means is fastened to the car 11 and a second end 18' of the drive means is fastened to the counterweight 12.

FIG. 5 is a schematic elevation view of the elevator installation shown in FIG. 4 with the drive unit 20 in a 2:1 suspension ratio. The drive means 19, 19' extends about deflecting rollers 13, 13' and 14, 14' mounted on the bottom of the car 11 and deflecting rollers 17, 17' mounted on the top of the counterweight 12.

FIG. 6 is a view similar to FIG. 5 with the drive unit 20 above a ceiling 10*a* of the shaft 10.

FIG. 7 is a view similar to FIG. 5 with the drive unit 20 above the car 11 in a 2:1 suspension ratio. Deflecting rollers 15, 15' are provided between the drive unit 20 and the deflecting rollers 13, 13' and deflecting rollers 16, 16' are provided between the drive unit 20 and the deflecting rollers 17, 17'.

FIG. 8 is a view similar to FIG., 5 with the drive unit 20 above the car 11 in a 1:1 suspension ratio and the deflecting rollers 16, 16' provided between the drive unit 20 and the counterweight 12.

While the drive unit 20 has been shown in the FIGS. 4 through 8, any of the drive units 20*a* through 20*d* could be substituted therefor.

According to the examples shown herein, two drive zones move at least two drive means by way of static friction. With knowledge of the present invention, one of experience in elevator construction can also use drive methods different from those illustrated in the examples. Thus, a drive unit with more than two drive zones can be used. Also, a drive pinion, which drive pinion is disposed in mechanically positive engagement with a cogged belt, can be used as the drive means.

The method of mounting a drive unit is significantly simplified by the illustrated drive units and, in particular, by the arrangement of the central bracket 22 between the drive zones, in the axis of symmetry of the resultant force traction of the drive means 19, 19', and the arrangement of a level setting means 27 at the motor end of the drive motor 1 in the drive unit 20*a* and the drive unit 20*c*. The orientation of the drive axis relative to the traction axis of the drive means can be carried out in simple, rapid and precise manner by means of the provided level setting means 27. Otherwise-usual, costly methods such as placement underneath of underlying members, wedges, etc., can be eliminated.

With knowledge of the present invention the expert in the field of elevators can vary the set forms and arrangements as desired. For example, he or she can construct the central bracket 22 separately from the bearing housing 7.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An elevator installation with a car, which car is guided with a car guide rail, and with a counterweight in a shaft and having a drive unit, which drive unit drives the car and the counterweight by support and drive means, wherein the drive unit comprises:

a drive shaft;

a motor and a brake connected to said drive shaft;

at least two support and drive device connected to the car and the counterweight; and at least two mutually spaced-apart drive zones wherein said at least two support and drive device are arranged in correspondence with a spacing of said at least two drive zones, said at least two drive zones being integrated into and directly machined in said drive shaft, whereby each of said at least two support and drive device engages an associated one of said at least two drive zones and said at least two support and drive device extend in the shaft on opposite sides of the car guide rail, and wherein said drive shaft is mounted by at least one central bearing, which said central bearing is arranged at right angles to an axis of the drive unit and acts in a plane of symmetry between said at least two drive zones, wherein said central bearing accepts support forces due to the support and drive device from the drive shaft along the plane of symmetry, and wherein an inner diameter of said central bearing is greater than an outer diameter of said at least two drive zones.

2. The elevator installation according to claim 1 wherein said central bearing is integrated in a bearing housing and said bearing housing encloses a majority of said drive shaft with said at least two drive zones.

3. The elevator installation according to claim 1 wherein said at least two drive zones are arranged symmetrical on a left side and a right side of a horizontal connecting line of car guides.

4. The elevator installation according to claim 1, the car guide rail having a foot section and said foot section defining a width of a rail foot of the car guide rail associated with the car, wherein a spacing between said at least two mutually spaced-apart drive zones is in a range from at least one times said width of said rail foot of the car guide rail associated with the car to three times said width of said rail foot of the car guide rail.

5. The elevator installation according to claim 1 wherein a spacing of said at least two drive zones from one another is in a range of 100 to 250 millimeters.

6. The elevator installation according to claim 1 wherein each of said support and drive device is a belt.

7. The elevator installation according to claim 1 wherein each of said support and drive device is attached to a crossbeam by vibration insulation means and said crossbeam is fastened respectively to a counterweight guide and to a car guide.

8. The elevator installation according to claim 6 wherein said belt has wedge ribs.

9. An elevator installation with a car, which car is guided with a car guide rail, and with a counterweight in a shaft and having a drive unit, which drive unit drives the car and the counterweight by support and drive means, wherein the drive unit comprises:

a drive shaft;

a motor and a brake connected to said drive shaft;

at least two support and drive device connected to the car and the counterweight; and at least two mutually spaced-apart drive zones wherein said at least two support and drive device are arranged in correspondence with a spacing of said at least two drive zones, said at least two drive zones being integrated into and directly machined in said drive shaft, whereby each of said at least two support and drive device engages an associated one of said at least two drive zones and said at least two support and drive device extend in the shaft on opposite sides of the car guide rail, wherein said drive shaft is mounted by at least one central bearing, which said central bearing is arranged at right angles to an axis of the drive unit and acts in a plane of symmetry between said at least two drive zones, wherein said central bearing accepts support forces due to the support and drive device from the drive shaft along the plane of symmetry, wherein the car guide rail has a foot section and said foot section defines a width of a rail foot of the car guide rail associated with the car, and wherein a spacing between said at least two mutually spaced-apart drive zones is in a range from at least one times said width of said rail foot of the car guide rail associated with the car to three times said width of said rail foot of the car guide rail, and wherein said motor and said brake are arranged outside of a space between said drive zones, and a support bearing is arranged at a motor end of said drive shaft and supporting said motor.

10. The elevator installation according to claim 9 wherein an inner diameter of said central bearing is greater than an outer diameter of said at least two drive zones.

11. The elevator installation according to claim 9 wherein said central bearing is integrated in a bearing housing and said bearing housing encloses a majority of said drive shaft with said at least two drive zones.

12. The elevator installation according to claim 9 wherein said at least two drive zones are arranged symmetrical on a left side and a right side of a horizontal connecting line of car guides.

13. The elevator installation according to claim 9 wherein a spacing of said at least two drive zones from one another is in a range of 100 to 250 millimeters.

14. The elevator installation according to claim 9 wherein each of said support and drive device is a belt.

15. The elevator installation according to claim 9 wherein each of said support and drive device is attached to a crossbeam by vibration insulation means and said crossbeam is fastened respectively to a counterweight guide and to a car guide.

16. The elevator installation according to claim 14 wherein said belt has wedge ribs.

* * * * *